United States Patent
Nord

(10) Patent No.: US 11,606,774 B2
(45) Date of Patent: Mar. 14, 2023

(54) RELAY-MEDIATED PAGING

(71) Applicant: Sony Group Corporation, Tokyo (JP)

(72) Inventor: Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/483,472

(22) PCT Filed: Jan. 18, 2018

(86) PCT No.: PCT/EP2018/051159
§ 371 (c)(1),
(2) Date: Aug. 5, 2019

(87) PCT Pub. No.: WO2018/145872
PCT Pub. Date: Aug. 16, 2018

(65) Prior Publication Data
US 2019/0373579 A1    Dec. 5, 2019

(30) Foreign Application Priority Data

Feb. 7, 2017 (EP) .................................... 17155026

(51) Int. Cl.
*H04W 68/02* (2009.01)
*H04W 76/28* (2018.01)
*H04W 76/10* (2018.01)
*H04B 7/14* (2006.01)
*H04W 8/00* (2009.01)
*H04W 88/04* (2009.01)

(52) U.S. Cl.
CPC .............. *H04W 68/02* (2013.01); *H04B 7/14* (2013.01); *H04W 8/005* (2013.01); *H04W 76/10* (2018.02); *H04W 76/28* (2018.02); *H04W 88/04* (2013.01)

(58) Field of Classification Search
None
See application file for complete search history.

(56) References Cited

U.S. PATENT DOCUMENTS

| 8,837,340 B2 | 9/2014 | Kwon | |
| 2008/0002741 A1* | 1/2008 | Maheshwari | H04W 68/02 370/473 |

(Continued)

FOREIGN PATENT DOCUMENTS

| CN | 101883350 A | 11/2010 |
| WO | 2017/196661 A1 | 11/2017 |

OTHER PUBLICATIONS

International Search Report and Written Opinion from corresponding International Patent Application No. PCT/EP2018/051159, dated Mar. 20, 2018; 11 pages.

(Continued)

*Primary Examiner* — Christine T Duong
(74) *Attorney, Agent, or Firm* — Tucker Ellis LLP

(57) ABSTRACT

At least one first control message (2011) indicative of the remote node (103) and of timing information (351, 352) is communicated between a network and a relay node (102). At least one second control message (2012) is communicated via a device-to-device, D2D, channel of the wireless link and between the relay node (102) and the remote node (103) in accordance with the timing information (351, 352). The at least one second control message is indicative of the network paging the remote node (103).

12 Claims, 15 Drawing Sheets

(56) References Cited

U.S. PATENT DOCUMENTS

| | | | |
|---|---|---|---|
| 2010/0002660 A1* | 1/2010 | Grayson | H04W 4/20 370/338 |
| 2012/0134318 A1* | 5/2012 | Park | H04W 68/00 370/315 |
| 2012/0155355 A1* | 6/2012 | Kwon | H04W 76/28 370/311 |
| 2012/0220214 A1* | 8/2012 | Du | H04B 7/15542 455/515 |
| 2013/0021932 A1 | 1/2013 | Damnjanovic | |
| 2020/0068380 A1* | 2/2020 | Wallentin | H04W 68/005 |

OTHER PUBLICATIONS

Intel Corporation, "Introduction of DRX over PC5", 3GPP TSG RAN WG2 Meeting #95bis, R2-166255, Oct. 1, 2016, Kaosiung.

* cited by examiner

FIG. 15

6011 trigger tansmission of at least one first control message indicative of a remote node and of timing information

US 11,606,774 B2

RELAY-MEDIATED PAGING

TECHNICAL FIELD

Various embodiments of the invention generally relate to a network paging a remote node via a relay node. Various embodiments of the invention specifically relate to the network paging the remote node using timing information for the relay node.

BACKGROUND

Mobile communication by means of a cellular network is an integral part of modern life. Examples of cellular networks include the Third Generation Partnership Project (3GPP) Long Term Evolution (LTE; sometimes also referred to as 4G) and 3GPP New Radio (NR; sometimes also referred to as 5G) technology. Here, the multiple nodes are connected to form a network. The network may include a plurality of cells.

For example, for the 3GPP LTE communication system, it is known to utilize a relay-based connection between a remote node—e.g., implemented by a wireless communication device (UE)—and a base station (BS) of the network. In comparison to a direct connection between the UE and the BS, such a relay-based connection extends via a relay node.

The relay node may be implemented by a further UE. Then, the relay-based connection may be established via a device-to-device (D2D) channel of the wireless link of the network. Corresponding functionalities are, e.g., described in 3GPP Technical Specification (TS) 23.303 V14.0.0 (2016-09), section 4.5.4. Sometimes, the relay functionality of the relay node is implemented on Internet Protocol (IP) level, i.e., the relay node made substantially act as an IP router. However, there have been other proposals to implement relay functionality on lower protocol layers, e.g., Layer 2 or Layer 3 of the Open Systems Interface (OSI) model.

In order to reduce power consumption of UEs, it is known to employ sleep patterns. An example of a sleep pattern is the so-called Discontinuous Reception (DRX). For example, according to the 3GPP LTE protocols, DRX can be implemented as described in 3GPP TS 36.321 V13.0.0, section 5.7 for Radio Resource Control (RRC) connected mode and in 3GPP TS 36.304, section 7.1 for RRC idle mode.

According to 3GPP LTE DRX for connected mode (connected DRX), the UE is ready to receive downlink (DL) data—e.g., signaling data or user data—during an active time of a DRX cycle. According to 3GPP LTE DRX for idle mode (idle DRX), the UE is ready to receive DL paging signals during the active time of the DRX cycle. In idle DRX, a RRC connection is not established during the active time, but only established on demand if the UE is in fact paged by the network.

In some scenarios, it may be required for the network to page a remote node. Sometimes, it may only be possible for the network to page the remote node via a relay node. This may be because the remote node may not be reachable by the BS via a direct channel. For example, the remote node may be located at the cell edge (limited coverage or enhanced coverage) of a cell defined by the BS or even beyond the cell edge (out-of-coverage).

In such examples where it is necessary to page the remote node via the relay node, conventional paging strategies may only provide limited possibility for applying sleep patterns at the remote node and/or the relay node. In particular these limitations and restrictions in sleep patterns may affect the latency for paging the remote nodes and the relay node. As a result may make the sleep patterns and paging latency suboptimum if the remote nodes and/or the relay node employ respective sleep patterns.

SUMMARY

Therefore, a need exists for advanced techniques of paging. In particular, a need exists for advanced techniques of paging that mitigate or overcome at least some of the above-identified limitations and drawbacks.

This need is met by the features of the independent claims. The dependent claims define embodiments.

A method includes a relay node receiving at least one first control message. The at least one first control message is received from a network node of a network and via a wireless link. The at least one first control message is indicative of a remote node and is further indicative of timing information. The method further includes the relay node transmitting at least one second control message. The at least one second control message is transmitted to the remote node. The at least one second control message is transmitted in accordance with the timing information. Each one of the at least one second control message is indicative of the network paging the remote node.

A computer program product includes program code that may be executed by at least one processor. Executing the program code can cause the at least one processor to perform a method. The method includes a relay node receiving at least one first control message. The at least one first control message is received from a network node of a network and via a wireless link. The at least one first control message is indicative of a remote node and is further indicative of timing information. The method further includes the relay node transmitting at least one second control message. The at least one second control message is transmitted to the remote node. The at least one second control message is transmitted in accordance with the timing information. Each one of the at least one second control message is indicative of the network paging the remote node.

A computer program includes program code that may be executed by at least one processor. Executing the program code can cause the at least one processor to perform a method. The method includes a relay node receiving at least one first control message. The at least one first control message is received from a network node of a network and via a wireless link. The at least one first control message is indicative of a remote node and is further indicative of timing information. The method further includes the relay node transmitting at least one second control message. The at least one second control message is transmitted to the remote node. The at least one second control message is transmitted in accordance with the timing information. Each one of the at least one second control message is indicative of the network paging the remote node.

A device includes control circuitry. The control circuitry is configured to receive, from a network node of a network and via a wireless link, at least one first control message indicative of a remote node and of timing information; and to transmit, to the remote node, at least one second control message in accordance with the timing information, each one of the at least one second control message being indicative of the network paging the remote node.

A method includes triggering transmission of at least one first control message. The transmission is via a wireless link and to a relay node. The at least one first control message is indicative of a remote node and of timing information. The at least one first control message causes the relay node to transmit, to the remote node, at least one second control message in accordance with the timing information. Each one of the at least one second control message is indicative of the network paging the remote node.

A computer program product includes program code to be executed by at least one processor. Executing the program code causes the at least one processor to perform a method. The method includes triggering transmission of at least one first control message. The transmission is via a wireless link and to a relay node. The at least one first control message is indicative of a remote node and of timing information. The at least one first control message causes the relay node to transmit, to the remote node, at least one second control message in accordance with the timing information. Each one of the at least one second control message is indicative of the network paging the remote node.

A computer program includes program code to be executed by at least one processor. Executing the program code causes the at least one processor to perform a method. The method includes triggering transmission of at least one first control message. The transmission is via a wireless link and to a relay node. The at least one first control message is indicative of a remote node and of timing information. The at least one first control message causes the relay node to transmit, to the remote node, at least one second control message in accordance with the timing information. Each one of the at least one second control message is indicative of the network paging the remote node.

A device includes control circuitry. The control circuitry is configured to trigger transmission, via a wireless link into a relay node, of at least one first control message indicative of a remote node and of timing information. The at least one first control message causes the relay node transmit, to the remote node, at least one second control message in accordance with the timing information. Each one of the at least one second control message is indicative of the network paging the remote node.

A method includes a remote node receiving at least one second control message. The at least one second control message is received from a remote node. The at least one second control message is received during an active time of a sleep pattern of the remote node. The timing information is received by the relay node in at least one first control message from the network. Each one of the at least one second control message is indicative of the network paging the remote node. The method further includes establishing a data connection with the network in response to receiving the at least one second control message.

A computer program product includes program code. The program code may be executed by at least one processor. Executing the program code causes the at least one processor to perform a method. The method includes a remote node receiving at least one second control message. The at least one second control message is received from a remote node. The at least one second control message is received during an active time of a sleep pattern of the remote node. The timing information is received by the relay node in at least one first control message from the network. Each one of the at least one second control message is indicative of the network paging the remote node. The method further includes establishing a data connection with the network in response to receiving the at least one second control message.

A computer program includes program code to be executed by at least one processor. Executing the program code causes the at least one processor to perform a method. The method includes a remote node receiving at least one second control message. The at least one second control message is received from a remote node. The at least one second control message is received during an active time of a sleep pattern of the remote node. The timing information is received by the relay node in at least one first control message from the network. Each one of the at least one second control message is indicative of the network paging the remote node. The method further includes establishing a data connection with the network in response to receiving the at least one second control message.

A device includes control circuitry. The control circuitry is configured to perform receiving, from a relay node, at least one second control message during an active time of a sleep pattern of the remote node. The timing information is received by the relay node in at least one first control message from the network. Each one of the at least one second control message is indicative of the network paging the remote node. The control circuitry is further configured to establish a data connection with the network in response to receiving the at least one second control message.

A system includes a first device including first control circuitry and a second device including second control circuitry. The first control circuitry is configured to receive, from a network node and via a wireless link, at least one first control message indicative of the second device and of timing information. The first control circuitry is configured to transmit, to the second device, at least one second control message in accordance with the timing information. The second control circuitry is configured to receive the at least one second control message. Each one of the at least one second control message is indicative of the network paging the second device. The second control circuitry is configured to establish a data connection with the network in response to receiving the at least one second control message.

A system includes a first device including first control circuitry and a second device including second control circuitry. The first control circuitry is configured to trigger transmission, via a wireless link and to the second device, of at least one first control message indicative of a remote node and of timing information. The second control circuitry is configured to receive the at least one first control message. The second control circuitry is configured to transmit, to the remote node, at least one second control message in accordance with the timing information. Each one of the at least one second control message is indicative of the network paging the remote node.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 15 is a flowchart of a method according to various examples.

DETAILED DESCRIPTION OF EMBODIMENTS

Figure 1:
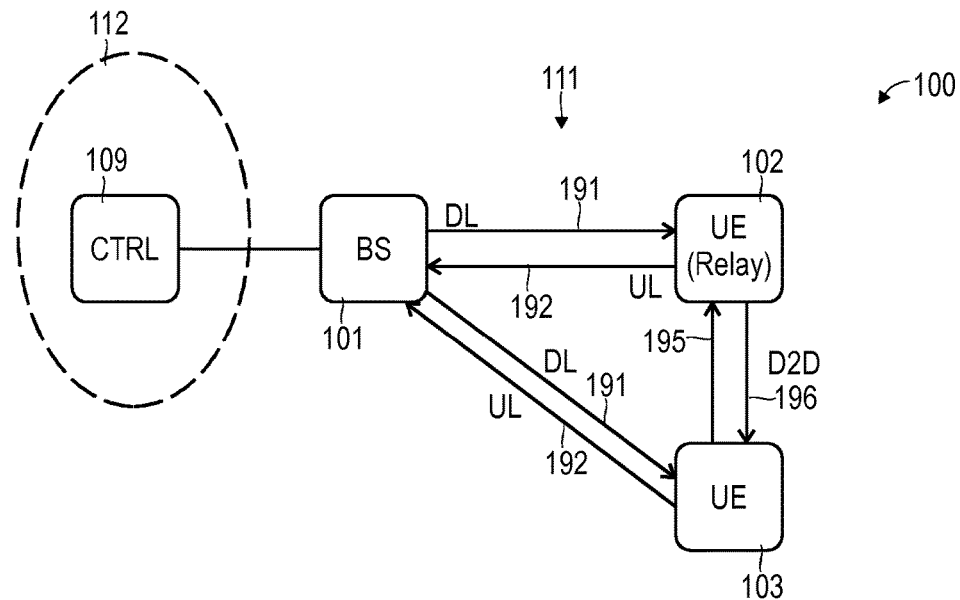
FIG. 1 schematically illustrates a network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by any indirect connection or coupling. A coupling between components may also be established over a wireless connection. Functional blocks may be implemented in hardware, firmware, software, or a combination thereof.

Hereinafter, techniques of repeatedly switching between an active state and a sleep state of an interface of a UE are described. Sometimes, such techniques of repeatedly switching between at least one active and a sleep state are referred to as a sleep pattern. An example sleep pattern—to which reference will be made hereafter for simplicity—is DRX. Examples of active states include states in which the UE listens for DL paging signals or control messages including a paging indicator and states in which the UE listens for DL data, e.g., DL control data and/or DL payload data. Thus, active states may also be referred to as ready-to-receive states. By only activating the active state of the interface every once in a while using a timing of the DRX cycle, power consumption of the UE can be reduced.

For example, the DRX cycle—e.g., for each repetition—may include a certain active time during which one or more active states of the interface are activated. Here, the UE may be ready to receive. Further, each repetition may include an inactive time during which a sleep state of the interface is activated. Here, the UE may be unfit to receive.

The interface may be fully or largely powered down when operating in the sleep state. Sometimes, the sleep state is also referred to as dormant state or power save state. For example, an analog front end of the interface may be disabled during the sleep state. This may include powering down one or more of the following: an analog amplifier; an analog-to-digital converter. For example, a supply voltage may not be provided to the analog amplifier and/or the analog-to-digital converter during the sleep state. Generally, during the sleep state the interface may be unfit for receiving DL data on the wireless link. The UE may not send position updates in the sleep state. Thus, generally, in the sleep state it may not be possible to send any DL data to the UE. It is possible that during the sleep state the UE remains registered in a respective repository of the network. All this enables a low power consumption of the UE in the sleep state.

Various active states are conceivable. Examples include listening for DL data and/or listening for DL paging signals or control messages including a paging indicator. In the active state, the interface of the UE may be powered up fully or to at least some degree. For example, the analog front end of the interface of the UE may not be fully powered down, but generally functional. However, certain functions in the digital front end may be disabled which may include limited demodulation/decoding functionality, etc.

A DRX cycle may be implemented according to a timing. For example, the timing may be negotiated between the UE and the network. Such negotiation of the timing may involve UL control signaling and/or DL control signaling. Sometimes, the negotiation may take place as part of an attach procedure for establishing a data connection on a wireless link between the UE and the network. In other examples, it would also be possible that the timing is predefined, e.g., according to a fixed standard, etc. The timing may be repetitive, i.e., may define repetitions of switching between the different states. For example, the timing may be repetitive in time domain: In some examples, it is possible that the timing implements a periodicity for subsequent repetitions. It is also possible that the repetitive timing is not strictly periodic, but shows a certain variation from repetition to repetition. The network may be aware of the timing.

Switching between an active state and a sleep state according to a DRX cycle may implemented in one or more modes of operating the UE. Examples include a connected mode and an idle mode. In the connected mode, and ongoing data connection between the UE and the network may be maintained. For example, the data connection may be implemented on the Network layer of the OSI model according to the International Standardization Organization (ISO) ITU-T X.200 (07/1994) document. For example, the data connection may include a bearer for identifying data on an UL payload channel and/or a DL payload channel. The UE may transmit frequent position updates to the network in the connected mode. For example, the serving cell at which the UE presently camps may be known at any given moment in time to the network. In the connected mode, the interface of the UE may be fully powered up. In the 3GPP LTE framework, an example is the RRC connected mode. Typically, the connected mode is associated with significant power consumption of the UE.

In the idle mode, it may not be required to maintain an ongoing data connection between the UE and the network. For example, in the idle mode—different to the connected mode —, the particular serving cell of a cellular network to which the UE is connectable may not be known to the network. The UE may or may not transmit infrequent position updates, e.g., when changing the tracking area, etc. For example, in the idle mode it may be possible for the network to page the UE, i.e., to send a DL paging signal to the UE, during a respective active time of the idle mode DRX cycle when the interface of the UE is in the active state. However, it may not be possible to directly send DL data. The DL paging may trigger the UE to transition into the connected mode. This may involve performing an attach procedure for establishing the payload channels of the wireless link. A data connection is established. An example of the idle mode in the 3GPP LTE framework is the RRC idle mode. See 3GPP TS 36.304 (2013), Release 11, Section 7 and 3GPP TS 36.331 (2013), Sections 5.3.2, 6.2.2.

Hereinafter, techniques are disclosed which enable combining DRX cycles with relay-based communication between the network and the remote UE. In particular, hereinafter, various examples are disclosed which enable network paging of the remote UE via a relay UE. Here, the techniques facilitate employing a first DRX cycle at the remote UE and a second DRX cycle at the relay UE. According to various examples, the first DRX cycle may be different from the second DRX cycle. In particular, it may be possible to independently negotiate the first DRX cycle and the second DRX cycle. This provides flexibility in choosing certain parameters of the first DRX cycle and the second DRX cycle, e.g., in choosing the periodicity and/or the duration of the active time of the first DRX cycle and the second DRX cycle. This helps to tailor setting of the parameters of the DRX cycles according to the power-save requirements of the remote UE and the relay UE. In particular, thereby, the overall energy consumption may be reduced.

The techniques disclosed herein enable independent DRX cycles for, both, the relay UE and the remote UE; at the same time, the techniques disclosed herein enable low-latency network paging of the remote UE via the relay UE. According to examples, this is achieved by communicating a control message from the network to the relay UE, the control message being indicative of the remote UE and of timing information. Then, a further control message can be communicated via a D2D channel of the wireless link of the network between the relay UE and the remote UE, the further control message being communicated in accordance with the timing information. Here, the further control message may be indicative of the network paging the remote UE. By providing the timing information from the network to the relay UE, it is possible to take into account any potential offsets between the DRX cycles of the relay UE and the remote UE. Thereby, the relay UE can be put into a position in which the further control message being indicative of the network paging the remote UE can be transmitted during an active time of the DRX cycle of the relay UE. This avoids unsuccessful transmission attempts due to the DRX cycle of the remote UE. Momentary synchronization between the relay UE and the remote UE may enable independent DRX cycles for the remote UE and the relay UE.

For example, according to reference implementations, in case the network intends to page the remote UE, it can be required to do so via the relay UE. However, if the remote UE and/or the relay UE have certain power-save settings resulting in DRX cycles being active, this can create unwanted dependencies. For example, if the relay UE receives a control message indicative of the network paging the remote UE, it may be unable to notify the remote UE for a comparably long duration according to a specific DRX cycles to coincide with each other. By means of the timing information, the DRX cycle of the relay UE can be temporarily modified in order to transmit the further control message indicative of the network paging the remote UE to the remote UE in accordance with the DRX cycle of the remote UE. Such a scenario limits additional control signaling required and does not significantly increase the power consumption for the remote UE and the relay UE. In particular, both the relay UE and the remote UE can have their preferred DRX cycle parameters negotiated independently with the network. The parameters of the DRX cycle of the remote UE and the relay UE can be stored in a control node of the network, e.g., a mobility management control node. Furthermore the relay UE and remote UE are not required to be aware of each other's DRX cycles/sleep patterns.

FIG. 1 schematically illustrates a network 100 according to various examples. The network 100 includes a BS 101, a relay UE 102, and a remote UE 103. The BS 101 and the relay UE 100 and to communicate on a wireless link 111. Here, DL channels 191 from the BS 101 to the relay UE 102, as well as uplink channels 192 from the relay UE 102 to the BS 101 are implemented on the wireless link 111. Payload data and/or control data can be transmitted via respective channels 191, 192.

In the example of FIG. 1, direct uplink and DL channels 191, 192 are also implemented between the BS 101 and the remote UE 103. This may be possible if the remote UE 103 is located within the cell defined by the BS 101. In other examples, it would also be possible that the remote UE 103 and the BS 101 do not establish direct channels 191, 192. This may be the case if the remote UE 103 is located outside of the cell defined by the BS 101, i.e., out of coverage with respect to the BS 101. Then, communication between the BS 101 and the remote UE 103 may be via the relay UE 102, only. As illustrated in FIG. 1, D2D channels 195, 196 can be implemented on the wireless link 111 between the relay UE 102 and the remote UE 103. Sometimes, the D2D communication is also referred to as sidelink communication. The resources on the D2D channels 195, 196 may be allocated by the relay UE 102 and/or by the BS 101. For example, the BS 101 may provide a set of candidate resources to the relay UE 102 and the relay UE 102 may then schedule transmission on the D2D channels 195, 196 in some or all of the candidate resources.

FIG. 1 also illustrates a core 112 of the network 100 (core network; CN). The core 112 includes a control node 109. The control node 109 may keep track of the mobility of the relay UE 102 and/or of the mobility of the remote UE 103. For example, the control node 109 may keep track of the particular cell/BS to which the relay UE 102 and the remote UE 103 are connected. Furthermore, it is possible that the control node 190 keeps track of the particular power-saving mode in which the relay UE 102 and the remote UE 103 are operating. For example, the control node 102 can keep track of certain parameters of the DRX cycle is employed by the relay UE 102 and the remote UE 103 to implement power saving. The control node 102 can keep track of the timing of the DRX cycle employed by the relay UE 102 and/or of the DRX cycle employed by the remote UE 103.

Figure 2:
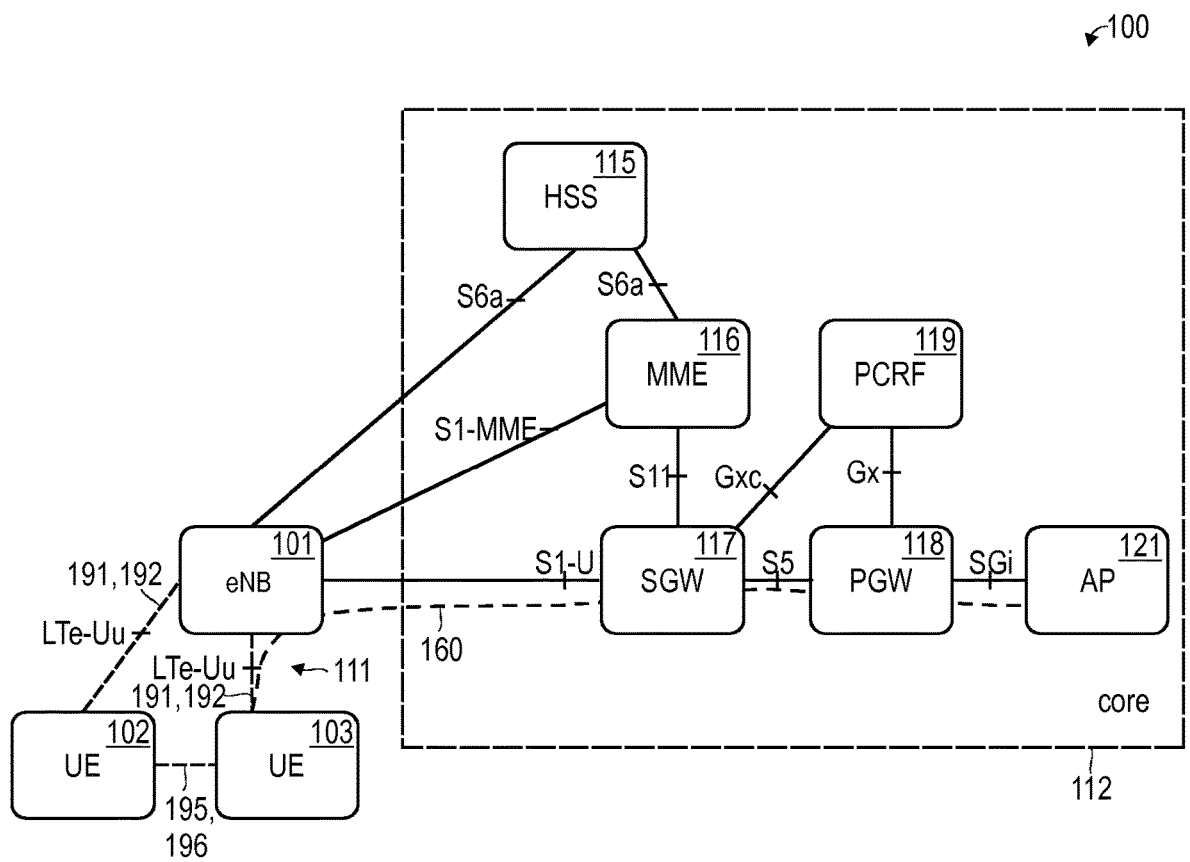
FIG. 2 schematically illustrates a network according to various examples.

FIG. 2 illustrates aspects with respect to the network 100. FIG. 2 illustrates further details with respect to the architecture of the network 100. The network 100 according to the example of FIG. 2 implements the 3GPP LTE architecture. According to 3GPP LTE, a wireless link 101 is defined in a radio access network (RAN). The wireless link 111 is defined between a BS in the form of an evolved node B (eNB) 112 and one or more UEs 102, 103. The wireless link 111 may implement one or more channels such as payload channels and/or control channels and/or paging channels, etc.

Furthermore, the network 100 includes a CN 112. The CN 112—the evolved packet core (EPC) in 3GPP LTE—is in communication with the RAN. The CN 112 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

For example, the MME 116 controls CN-initiated paging of the UEs 102, 103 if the respective UE 102, 103 operates in RRC idle mode. The MME 116 may keep track of the timing of the DRX cycle of the UE 102 and/or of the DRX cycle of the 103. For example, the MME 116 may be part of establishing a data connection 160.

The data connection 160 is established if the respective UE 102, 103 operate in RRC connected mode. To keep track of the current state of the UEs 102, 103, the MME 116 sets the UE 102, 103 to ECM connected or ECM idle. During ECM connected, a non-access stratum (NAS) connection is maintained between the UE 102, 103 and the MME 116. The NAS connection implements an example of a mobility control connection.

The general functioning and purpose of the network nodes 115-119, 121 of the CN 112 is well known in the art such that a detailed description is not required in this context.

The data connection 160 is established between the UE 102, 103 via the RAN and the data layer of the CN 112 and towards an access point 121. For example, a connection with the Internet or another packet data network can be established via the access point 121. To establish the data connection 160, it is possible that the respective UE 102, 103 performs a random access (RACH) procedure, e.g., in response to reception of network paging. A server of the packet data network or the Internet may host a service for which payload data is communicated via the data connection 160. The data connection 160 may include one or more bearers such as a dedicated bearer or a default bearer. The data connection 160 may be defined on the RRC layer, e.g., generally Layer 3 of the OSI model of Layer 2. Establishing of the data connection 160 may thus include OSI Network layer control signaling. By means of the data connection 160, resources may be allocated on payload channels such as the Physical Uplink Shared Channel (PUSCH) and/or the Physical DL Shared Channel (PDSCH) to facilitate transmission of payload data. A control channel such as the Physical DL Control Channel (PDCCH) can facilitate transmission of control data. Also a Physical Uplink Control Channel (PUCCH) can be implemented. The data connection 160 may also be established with the remote UE 103 via the relay UE 102 in response to paging of the remote UE 103.

The illustration of the network 100 in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). For example, the techniques described herein may be applied to the 3GPP eNB-IoT or MTC systems or 3GPP New Radio (NR) systems. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

Figure 3:
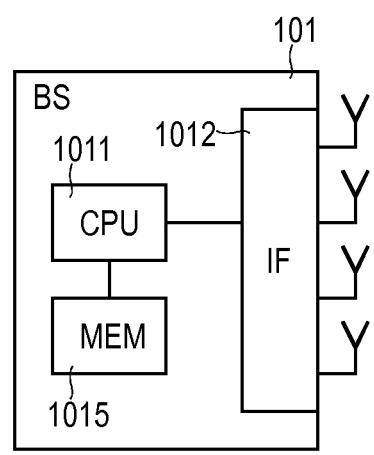
FIG. 3 schematically illustrates a BS of the network according to various examples.

FIG. 3 illustrates aspects with respect to the BS 101. The BS includes a processor 1011 and a memory 1015. The processor 1011 and the memory 1015 can implement control circuitry, e.g., in hardware and/or software. The BS 101 also includes an interface 1012. For example, the interface 1012 may include a digital front end and/or an analog front end. For example, the analog front end may be connectable to one or more antennas. For example, the interface 1012 may include one or more antenna ports. For example, the analog front end may include an amplifier such as a low-noise amplifier and an analog-to-digital converter for receiving modulated and encoded signals. The analog front end may include a digital-to-analog converter for transmission. For example, the digital front end—when receiving data—may be configured to perform tasks such as: demodulation; decoding; de-interleaving; calculation of checksums; etc. For example, the digital front end may implement lower-level functionality according to the Open Systems Interface (OSI) model. Typically, such tasks as demodulation and decoding are also associated with considerable energy consumption.

The memory 1015 may store program code that may be executable by the processor 1011. Executing the program code may cause the processor 1011 to perform techniques as described herein with respect to: network paging of a relay UE; network paging of a remote UE; network paging of a remote UE via a relay UE by means of timing information provided to the relay UE; etc.

Figure 4:
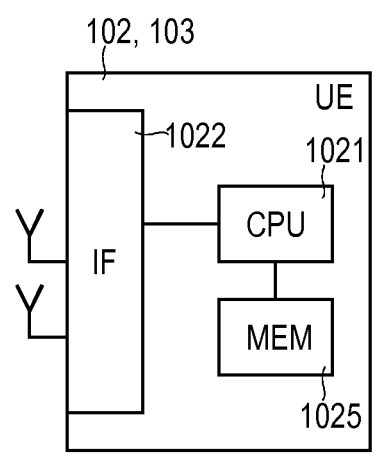
FIG. 4 schematically illustrates a UE of the network according to various examples.

FIG. 4 illustrates aspects with respect to the UEs 102, 103.

For example, the UE 102, 103 may be implemented by one or more of the following: a smartphone; a cellular telephone; a smart television; a sensor; an actuator; a laptop; the tablet PC.

The UEs 102, 103 include a processor 1021 and a memory 1025. The processor 1021 and the memory 1025 can implement control circuitry, e.g., in hardware and/or software. The UEs 102, 103 further include an interface 1022. The interface 1022 may include the digital front end and/or an analog front end. The analog front end may be connectable to one or more antennas. For example, the interface 1022 may include one or more antenna ports. For example, the analog front end may include an amplifier such as a low noise amplifier and an analog-to-digital converter for receiving modulated and encoded signals. The analog front end may include a digital-to-analog converter for transmission. For example, the digital front end—when receiving data—may be configured to perform tasks such as: demodulation; decoding; de-interleaving; calculation of checksums; etc. For example, the digital front end may implement lower-level functionality according to the OSI model. Typically, such tasks as demodulation and decoding are also associated with considerable energy consumption. It is possible to deactivate some or all of the functionality of the interface 1022 when operating in a sleep state during the inactive time of a DRX cycle to reduce energy consumption.

The memory 1025 may store program code that may be executed by the processor 1021. Executing the program code can cause the processor 1021 to perform various techniques as disclosed herein, e.g.: receiving a control message indicative of timing information and transmitting a further control message to the remote UE in accordance with the timing information; relaying network paging of the remote UE; establishing a data connection with the network in response to network paging; establishing a data connection with the network via a relay node or directly with the network.

The interface 1022 may operate according to different states of operation. These states of operation may include one or more active states in which the interface 1022 is able to receive some or all DL data and/or signals transmitted on the wireless link 111. For example, in the active states, the amplifier and/or the analog to digital converter may be at least sometimes and/or at least partially provided with the supply voltage. The states may further include a sleep state in which the interface 1022 is unfit to receive DL data transmitted on the wireless link 111. Typically, the power consumption of the UE 102, 103 is reduced at the interface 1022 operates according to the sleep state if compared to the interface 1022 operating according to one of the at least one active states. The different states may be alternatingly activated based on the DRX cycle. Different states may be associated with different modes in which the UE 102, 103 operates towards the network 100, e.g., idle mode, connected mode, or power-saving mode.

Figure 5:
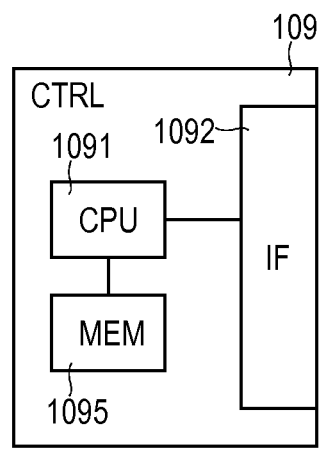
FIG. 5 schematically illustrates a control node of the network according to various examples.

FIG. 5 schematically illustrates the control node 109. For example, the control node 109 may be implemented by the MME 116 if the network 100 is configured according to the 3GPP LTE communication architecture.

The control node 109 includes a processor 1091 and a memory 1095. For example, the processor 1091 and the memory 1095 can implement control circuitry, e.g., in hardware and/or software. The control node 1092 further includes an interface 1092. By means of the interface 1092, the controller 109 is configured to communicate with other nodes of the network 100, e.g., with the BS 101 or gateway nodes 117, 118.

The memory 1095 may store program code that may be executed by the processor 1091. Executing the program code can cause the processor 1091 to perform various techniques as disclosed herein, e.g.: triggering network paging of a relay UE and/or a remote UE; trigger transmission of a paging control message to the relay UE; determining timing information to be included in the paging control message, e.g., based on the timing of the DRX cycles of the relay UE and/or the remote UE; etc.

Figure 6:
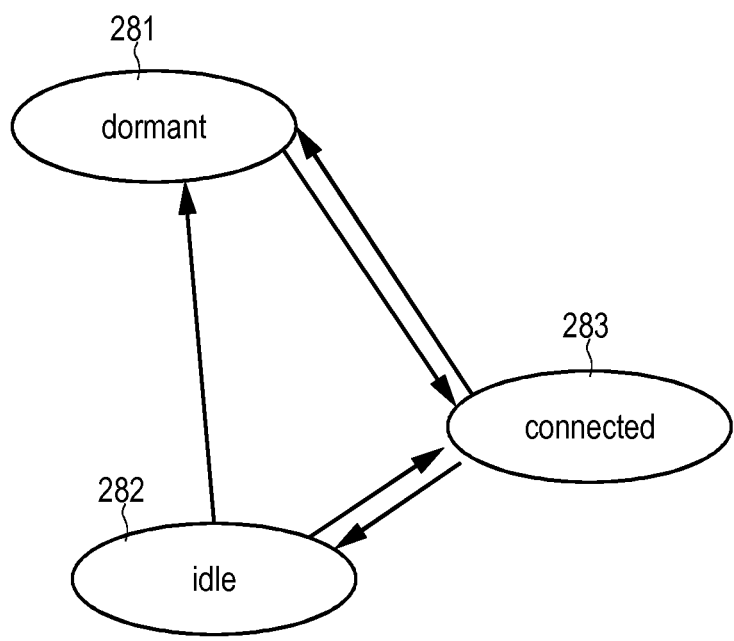
FIG. 6 schematically illustrates different power saving states including an idle state defining a sleep pattern according to various examples.

FIG. 6 schematically illustrates aspects with respect to various modes 281-283 in which the UE 102, 103 can operate. Each modes 281-283 can imply different states of operation of the interface 1022 of the UE 102, 103, e.g., as part of a respective DRX cycle.

FIG. 6 illustrates RAN modes of the UE 102, 103, i.e., modes which define the behavior of the UE within the RAN. For example, respective mode indicators may be maintained in a BS 101 of the RAN and/or the control node 109 of the CN 112.

In the example of FIG. 6, a dormant mode 281 is illustrated. Here, the UE 102, 103 is not fully detached from the network 100, thus still registered, e.g., in EMM registered according to 3GPP LTE specification. Position updates are typically not transmitted from the UE 102, 103 to the network 100. Thus, the network 100 is unaware of a position of the UE 102, 103. For details on the dormant state, see 3GPP TS 23.401 V13.0.0 (2014-09), section 4.3.22 "UE Power Saving Mode". For example, see 3GPP TS 23.682 V13.4.0 (2015-12). The network-initiated paging procedure is described in 3GPP TS 23.401.

In the further modes 282-283, the UE 102, 103 is generally ready to receive DL data, e.g., at least during certain time slots and/or on certain frequencies and/or according to certain coding/modulation. The further modes 282-283 may implement DRX cycles using different states of the interface 1022.

In FIG. 6, an idle mode 282 is illustrated. The idle mode 282 may correspond to RRC idle in the 3GPP LTE framework. Here, the UE 102, 103 can be paged during active times of an idle mode DRX cycle (sometimes referred to as paging occasions). Position updates may only be transmitted comparably infrequently or with a coarse accuracy, e.g., not defined on cell level. In response to being paged, the UE 102, 103 may transition into the connected mode 283.

In a connected mode 283, the UE 102, 103 maintains the data connection 160 with the network 100. See TS 36.331, chapter 4.2. This means that HOs between different serving cells of the cellular network 100 can be implemented without loss of the data connection 160. For this, the UE 102, 103 may transmit measurement reports on a quality of communicating on the wireless link.

Figure 7:
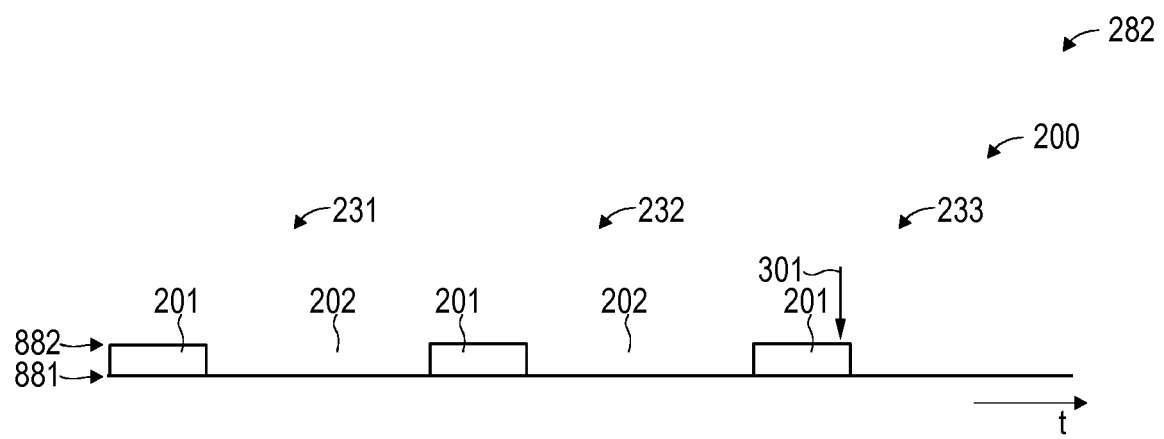
FIG. 7 schematically illustrates a sleep pattern including active times and inactive times according to various examples.

FIG. 7 illustrates aspects with respect to the idle mode 282. In particular, FIG. 7 illustrates aspects with respect to the DRX cycle 200 that may be implemented during idle mode 282. In FIG. 7, for illustrative purposes, three repetitions 231-233 of the DRX cycle 200 are illustrated. However, the DRX cycle 200 may include a larger number of repetitions 231-233 or a smaller number of repetitions 231-233. The number of repetitions 231-233 may be defined a priori or may not be defined a priori.

Each repetition 231-233, according to the example of FIG. 7, includes an active time 201 and an inactive time 202. The active time 201 and the inactive time 202 add up to the periodicity of the DRX cycle 200. In some examples, the duration of the active time 201 may be significantly smaller than the duration of the inactive time. For example, the duration of the active time may be on the order of milliseconds or seconds. For example, the duration of the inactive time 202 may be in the order of seconds, minutes, hours, or even days. While in the example of FIG. 7, a periodicity of the repetitions 231-233 is implemented, in other examples, different repetitions may have different durations.

FIG. 7 illustrates an example of the DRX cycle 200 according to the idle mode 282. Here, during the active time 201, the interface 1022 of the respective UE 102, 103 is in an active state 882 and is ready to receive a DL paging signal. For example, in the active state 882, the interface 1022 may be ready to receive the DL paging signal as a Layer 1 or Layer 2 or Layer 3 control message according to the OSI model. For example, during the active period 882, the interface 1022 may be ready to receive the DL paging signal on a direct channel from the BS 101 or on a D2D channel from a relay UE. During the active time 201 of the DRX cycle 200 according to the idle mode 282, the interface 102 may be configured to selectively listen for paging on a certain subfraction of resources of the spectrum. This may reduce energy consumption. Further, it may be possible that certain decoding functionality etc. is deactivated. Generally, during the active time 201 of the DRX cycle 200 according to the idle mode 282, the interface 102 may be unfit to receive encoded payload data or certain encoded control data, e.g., Layer 3 control data.

During the inactive time 202, the interface 1022 is in a sleep state 881 and is not ready to receive signals and/or data to save power. In the example of FIG. 7, reception of the DL paging signal 301 triggers a RACH procedure for setting up the data connection 160 (not illustrated in FIG. 7). Also, a NAS connection (not illustrated in FIG. 7) with the MME 116 is established. As such, during the DRX cycle 200 of FIG. 7, the mobility control connection with the MME 116 may be temporary teared down during the RRC Idle mode 282.

Figure 8:
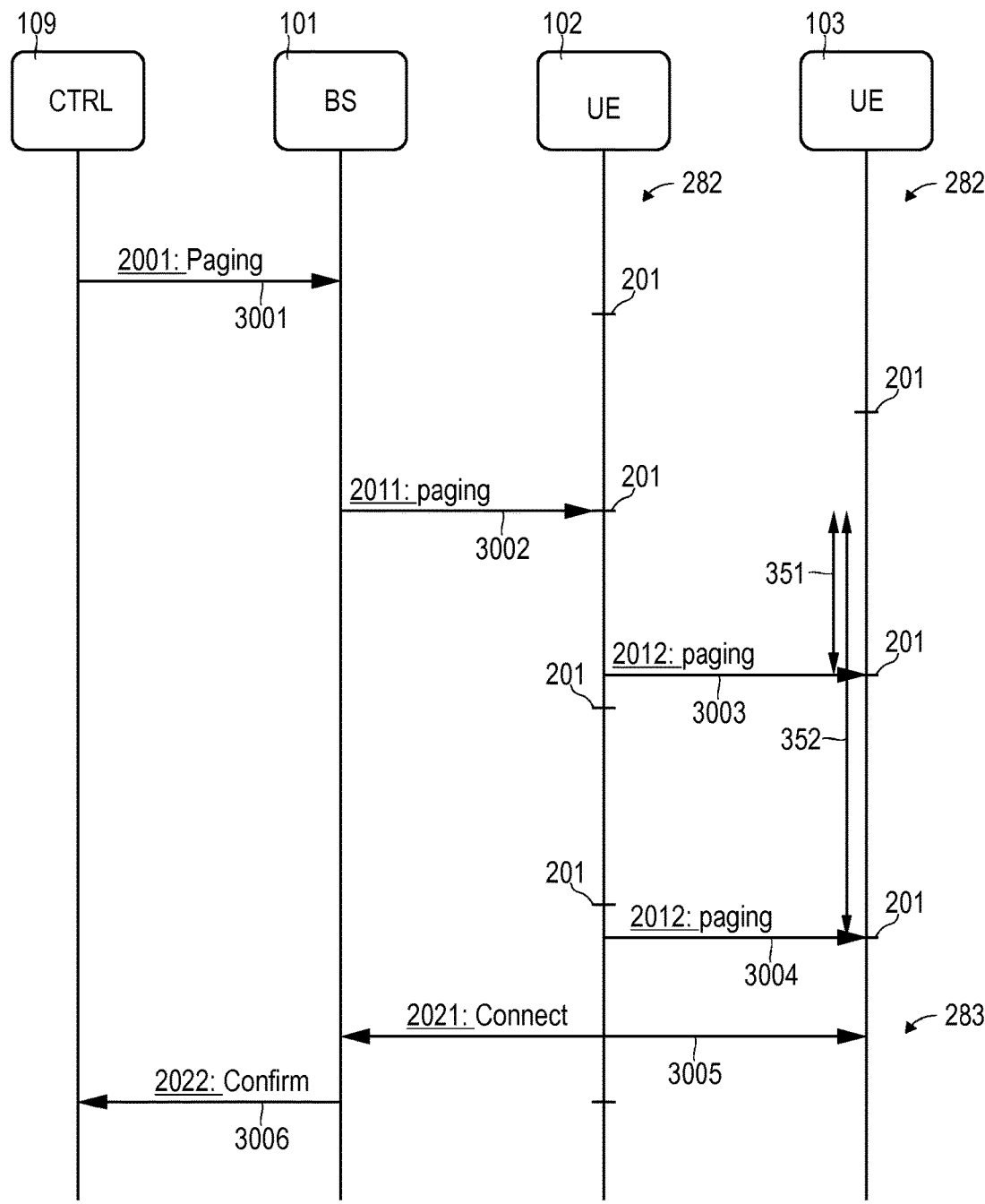
FIG. 8 is a signaling diagram schematically illustrating network paging of a remote UE via a relay UE according to various examples.

FIG. 8 illustrates aspects with respect to the network 100 paging a remote UE 103 via a relay UE 102. In particular, FIG. 8 illustrates CN-initiated paging of the remote UE 103, i.e., in the example of FIG. 8 initiated by the control node 109. Similar techniques as disclosed with respect to FIG. 8 could be readily applied for radio access network-initiated paging of the remote UE 103, e.g., initiated by the BS 101.

At 3001, the control node 109 transmits a paging control message 2001 to the BS 101. For example, in the 3GPP LTE framework, the paging control message 2001 may be implemented by the so-called paging request message. For example, the paging control message 2001 may be transmitted in response to DL data arriving at a gateway node 117, 118 and directed to the remote UE 103 (not illustrated in FIG. 8).

At the time of transmitting the paging control message 2001, both, the relay UE 102, as well as the remote UE 103 are in idle mode 282, i.e., implement a DRX cycle (in FIG. 8, the active times 201 and one of the DRX cycles 200 of the relay UE 102 and the remote UE 103 are illustrated).

In response to receiving the paging control message 2001, the BS 101 transmits a paging control message 2011 at 3002 on the wireless link 111 to the UE 102. As such, the control node 109 triggers transmission of the paging control message 2011. As illustrated in FIG. 8, the BS 101 transmits the paging control message 2011 during the active time 201 and one of the DRX cycle 200 of the relay UE 102. Therefore, the UE 102 can receive the paging control message 2011 at 3002. For example, the paging control message 2011 could be transmitted on a DL control channel or a DL paging channel implemented on the wireless link 111.

As illustrated in FIG. 8, the DRX cycle 200 of the relay UE 102 is different from the DRX cycle 200 of the relay UE 103. Hence, the active times 201 of the DRX cycle 200 of the relay UE 202 and of the DRX cycle 200 of the remote UE 103 are not aligned in time domain. To account for this timeshift, the paging control message 2011 is indicative of timing information. The timing information may be determined by the control node 109 based on the DRX cycles 200 of, both, the relay UE 102 and the remote UE 103. Alternatively or additionally, the timing information may at least partly determined by the BS 101 e.g., in response to receiving the paging control message 2001 at 3001.

The timing information—in the example of FIG. 8—is indicative of a time offset 351 of transmission of the paging control message 2011 from the BS 101 to the relay UE 102 and transmission of the paging control message 2012 at 3003 between the relay UE 102 and the remote UE 103. In the example of FIG. 8, the timing information is further indicative of the time offset 352 between transmission of the paging control message 2011 at 3002 and transmission of the paging control message 2012 at 3004. Generally, the timing information may be indicative of one or more time offsets. Furthermore, generally, the timing information may be indicative of one or more transmission occasions of the paging control message 2012.

The time offsets could be specified in absolute timing durations or in terms of transmission frames or subframes. Alternatively or additionally, it would also be possible that the timing information is indicative of a delay until transmission of the paging control message 2012, e.g., in absolute terms. For example, a subframe number could be specified which indicates the subframe that should be used for transmitting the paging control message 2012.

In still a further example, the timing information may be indicative of a point in time, e.g., in absolute terms. Here, it may be beneficial if the clocks of the relay node and the network are accurately synchronized with respect to a common timing reference.

By means of the timing information, the relay UE 102 is enable to transmit the paging control message 2012 time-aligned with the active times 201 of the DRX cycle 200 of the remote UE 103. Therefore, it is possible that, generally, the DRX cycle 200 of the relay UE 102 and the DRX cycle 200 of the remote UE 103 are negotiated independently with the relay UE 102 and the remote UE 103, respectively. Thereby, it becomes possible to tailor the DRX cycles 200 to the respective needs of the relay UE 102 and the remote UE 103.

The paging control message 2011 is furthermore indicative of the remote UE 103. This facilitates addressing the paging control message 2012 to the remote UE 103. The paging control message 2011 triggers the relay UE 102 to relay network paging for the remote UE 103. For example, the paging control message 2011 may include an indicator indicative of the identity of the remote UE 103, e.g., the International Mobile Subscriber Identity (IMSI), or a temporary ID (TMSI). In other examples, it would also be possible that the paging control message 2011 is implicitly indicative of the remote UE 103, e.g., by including timing information which is specific for the remote UE 103 and/or by including indicators of resources to be used for transmitting the paging control message 2012 which are dedicatedly allocated to the remote UE 103. This may help to address privacy concerns. Further security can be achieved if the DRX cycle of the remote UE 103 does not employ a strict periodicity, but some variation from repetition to repetition to prevent that the relay UE 102 can interpolate the future behavior of the remote UE 103.

In the example of FIG. 8, the paging control message 2011 is received by the relay UE 102 operating in idle mode 282. Accordingly, the UE 102 is configured to receive a certain amount of data in idle mode 282. For example, the paging control message 2011 could be a Layer 1 control message which includes a data bit field. Typically, the amount of data to be transmitted to the relay UE 102 operating in idle mode 282 can be comparably limited.

The paging control message 2012 is indicative of the network 100 paging the remote UE 103. It is generally uncertain whether the remote UE 103 has moved out-of-coverage of the relay UE 102 due to its mobility. Therefore, it may be helpful to provision multiple transmission occasions of the paging control message 2012: In the example of FIG. 8, the remote UE 103 does not receive the paging control message 2012 at 3003—e.g., due to interference on the wireless link 111. The remote UE 103, however, receives the paging control message 2012 at 3004. In response to receiving the paging control message 2012 at 3004, the remote UE 103 establishes the data connection 106 with the network 100.

For this purpose, at 3005, the remote UE 103 and the BS 101 perform a connection setup procedure 2021. For example, the connection setup procedure 2021 may include a RACH procedure and/or a Layer 3 connection procedure such as a RRC connection setup. Once the data connection 160 has been established between the remote UE 103 and the BS 101, the control node 109 is informed accordingly by means of a confirmation control message 2022 communicated at 3006.

In the example of FIG. 8, the remote UE 103 establishes the data connection 160 with the BS 101 on a direct channel 191, 192 of the wireless link 111. i.e., the relay UE 102 is not involved in establishing the data connection. However, in other examples, it would also be possible that the data connection 160 is established via the relay UE 102 which provides the paging control message 2012 or even via another relay UE which has not provided the paging control message 2012 (not shown in FIG. 8). To this respect, the remote UE 103 may be configured to select between establishing the data connection 160 with the network 100 via the D2D channel 195, 196 of the relay UE 102, a further D2D channel 195, 196 of a further relay UE, or on a direct channel 191, 192 of the BS 191.

As illustrated in FIG. 8, both, the relay UE 102, as well as the remote UE 103 are respectively required to monitor their own paging occasions—i.e., listen for network paging during the active times 201 of their respective DRX cycle 200 only. For example, the relay UE 102 is not required to monitor the paging occasions of the remote UE 103—and vice versa. For example, for the relay UE 102 to monitor the paging occasions of the remote UE 103 would increase the power consumption of the relay UE 102. Furthermore, awareness of certain properties of the DRX cycle 200 of the remote UE 103 and details of the identity of the remote UE 103 that might be required to calculate the paging occasions of the remote UE 103 may cause privacy concerns, since the calculation might require awareness of the remote UE IMSI.

In the example of FIG. 8, network paging of the remote UE 103 is finally successful, i.e., the data connection 160 between the remote UE 103 and the BS 101 is established. However, scenarios are conceivable where the network paging via the relay UE 102 is not successful. Reasons for this may be mobility of the remote UE 103 and/or of the relay UE 102. In such a scenario, it would be possible that the BS 101 and/or the control node 109 implement a paging escalation strategy. For example, it would be possible to set, in accordance with the timing information, at least one of the paging escalation timer for paging the remote UE 103 in further cells of the network 100 and a de-registration timer for listing the remote UE 103 as disconnected.

Thus, if the relay UE 102 is unable to contact the remote UE 103 within a reasonable time—which may be monitored by a respective timer—this can result in the network 100 applying the paging escalation strategy. Applying the paging escalation strategy may result in the network 100 using other paging resources in other cells of the network 100. Here, direct paging of the remote UE 103 is conceivable. Alternatively or additionally, if the remote UE 103 cannot be reached by the relay UE 102, it would be possible to de-register the remote UE 103. This can be based on the assumption that the remote UE 103 has left the network. The network 100 could then implement some mobility-management control signaling if the remote UE 103 is no longer camping on the relay UE 102.

Figure 9:
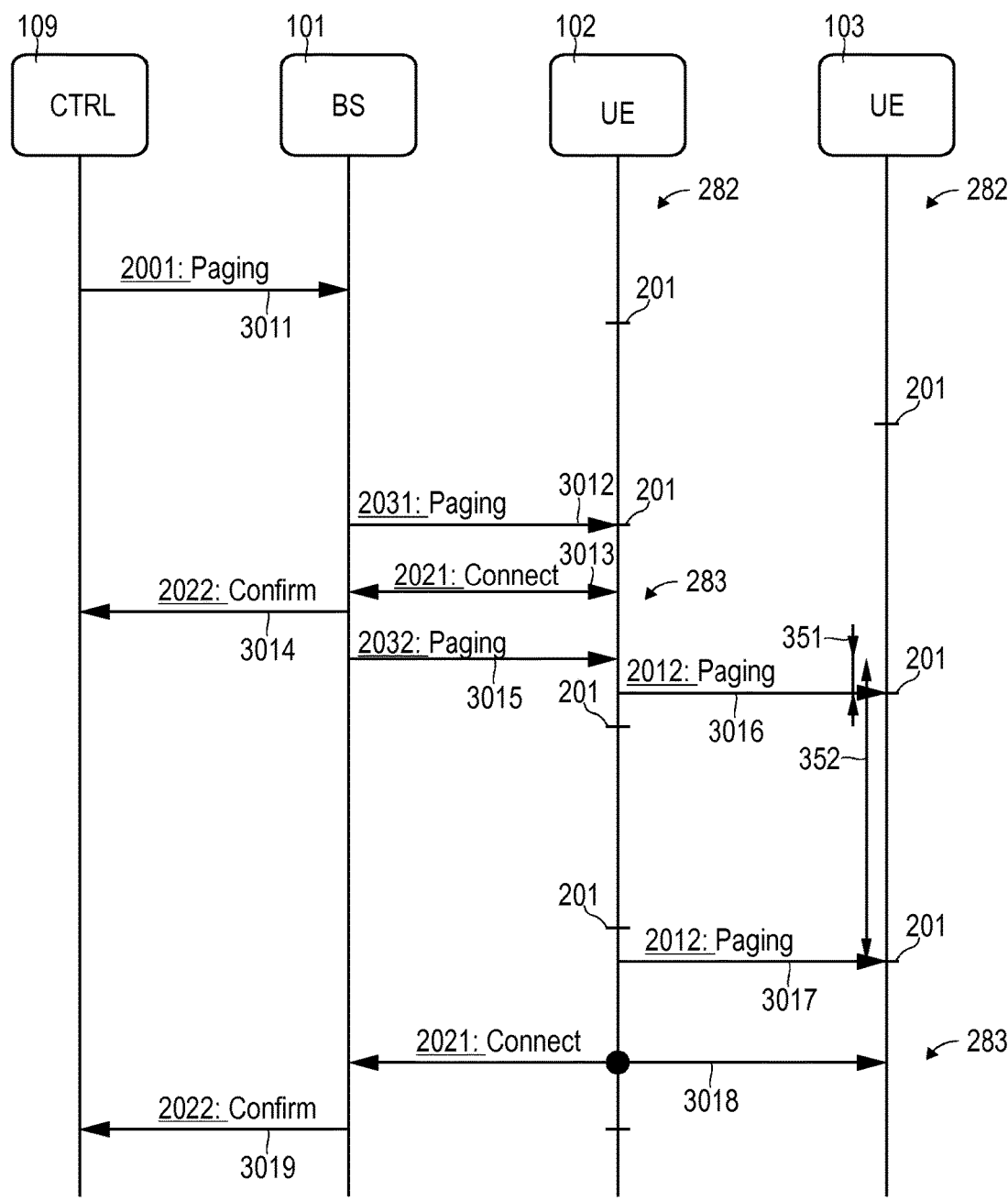
FIG. 9 is a signaling diagram schematically illustrating network paging of a remote UE via a relay UE according to various examples.

FIG. 9 schematically illustrates aspects with respect to network paging. In particular, FIG. 9 schematically illustrates aspects with respect to network paging of the remote UE 103 via the relay UE 102. The example of FIG. 9 generally corresponds to the example of FIG. 8. However, in the example of FIG. 9, the relay UE 102 leaves idle mode 282 to establish a respective data connection 160 with the BS 102 and commences operation in connected mode 283. For example, such a setup of the data connection 160 between the relay UE 102 and the BS 101 can facilitate transmission of indicators indicative of the timing information and/or transmission of the indicator indicative of the identity of the remote UE 103 from the BS 101 to the relay UE 102.

First, at 3011, the control node 109 sends a paging control message 2001 to the BS 101. This triggers transmission of the paging control message 2031 at 3012 from the BS 101 to the relay UE 102. In the example of FIG. 9, the paging control message 2031 is indicative of the network 100 paging the relay UE 102. Therefore, in response to receiving the paging control message 2031 during the respective active time 201 of the DRX cycle 200, the relay UE 102 participates in a connection setup 2021 at 3013. This is to establish a data connection 160 between the network and the relay UE 102.

Once the data connection 160 has been set up between the relay UE 102 and the BS 101, a respective confirmation control message 2022 is transmitted to the control node 109 at 3014.

By means of the data connection 160 it is then possible to transmit a larger amount of data. In particular, it is possible to transmit the paging control message 2032 at 3015 via the data connection 160 established between the BS 101 and the relay UE 102. Again, the paging control message 2032 is indicative of the remote UE 103 and, furthermore indicative of the timing information. The timing information, again, may be indicative of the timing offsets 351, 352. The relay UE 102—in response to receiving the paging control message 2032—transmits the paging control message 2012 at 3016 to the remote UE 103. The paging control message 2012 is indicative of the network paging the remote UE 103. For example, the paging control message 2012 may be a Layer 1 control message, e.g., relating to a paging signal not including encoded data. At 3017, the control message 2012 is successfully received by the remote UE 103.

For example, in the various examples described herein, the paging control message 2012 could be a Layer 1 control message. For example, the paging control message 2012 could be implemented by a paging signal not encoded data. For example, the paging control message 2012 could implement a paging reference signal. In other examples, the paging control message 2012 may further be indicative of an announcement for D2D discovery of the relay UE 102 by the remote UE 103. This announcement may facilitate setup of the data connection 160 on the D2D channel 195, 196 of the wireless link 111. Such an announcement facilitates establishing of the data connection 160 between the network 100 and the remote UE 103 via the relay UE 102. In other examples, the paging control message 2012 may not be indicative of the announcement for D2D discovery; but rather be communicated as a direct one2one communication message from the relay UE 102 to the remote UE 103. In other words, the D2D channel 195, 196 between the relay UE 102 and the remote UE 103 may be pre-configured; then, it may not be required to send the announcement and perform D2D discovery. Rather, the paging control message 2012 may be communicated on the set-up and ready-to-use D2D channel 195, 196.

In response to receiving the paging control message 2012 at 3017, the remote UE 103 establishes the data connection 160 with a BS 101 via the relay UE 102. A respective connection setup 2021 is executed at 3018. In the example of FIG. 9, low-latency setup of the data connection 160 between the BS 101 and the remote UE 103 via the relay UE 102 is facilitated by the relay UE 102 having already transitioned into the connected mode 283 at 3013. Alternatively, the relay UE 102 will perform RACH triggered by and part of the connection setup 2021.

3019 corresponds to 3006.

From a comparison of the examples of FIGS. 8 and 9, it follows that network paging of the relay UE 103 does not necessarily have to result in the setup of a data connection 160 between the relay UE 102 and the BS 101. Rather, as illustrated in FIG. 8, it would also be possible that the relay UE 102 commences operation in the idle mode 282 employing a respective DRX cycle 200. In such a scenario, it would be possible that in response to receiving the paging control message 2011 during the active time 200 of the respective DRX cycle 200, the relay UE 102 modifies the DRX cycle 200 to transmit the paging control message 2012 in accordance with the timing information. This is illustrated in FIG. 8, where the paging control message 2012 is transmitted at a point in time which deviates from the active times 201 of the DRX cycle 200 of the relay UE 102. In the scenario of FIG. 9, however, the data connection 160 between the relay UE 102 and the BS 101 is established in response to receiving the paging control message 2031. Hence, in a further scenario, it would be possible to establish the data connection 160 between the relay UE 102 and the BS 101 not in response to receiving the paging control message 2031; but rather if and in response to the remote UE 103 establishing the data connection between the remote UE 103 and the BS 101 via the relay UE 102, i.e., in response to the connection setup received by the relay UE 102 from the remote UE 103 at 3018.

Figure 10:
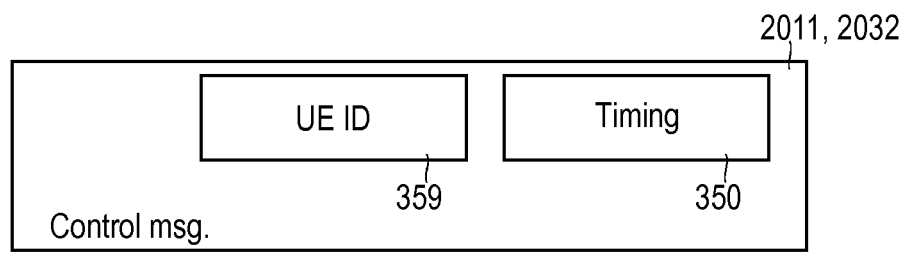
FIG. 10 schematically illustrates a control message employed for network paging of the remote UE according to various examples.

FIG. 10 illustrates aspects with respect to the paging control messages 2011, 2032 transmitted and/or received (communicated) between the relay UE 102 and the remote UE 103. As illustrated in FIG. 10, the paging control message 2011, 2032 may be generally indicative of the identity of the remote UE and of the timing information. As such, it is possible that the paging control message 2011, 2031 includes an indicator 359 indicative of the identity of the remote UE 103 and further includes an indicator 350 indicative of the timing information.

In some examples, the paging control message 2011, 2032 could be indicative of the identity of the remote UE 103 in an implicit manner. For example, the control message 2011, 2032 may be indicative of time-frequency resources—e.g., defined in a respective resource grid allocating symbol slots and subcarriers of a respective modulation technique—on which the remote UE 103 will listen for network paging. For example, these resources may be dedicated to the remote UE 103 such that transmission on these resources is implicitly indicative of the remote UE 103. Thereby, it may be avoided to compromise privacy-sensitive information such as the identity of the remote UE 103.

In some examples, the indicators 359, 350 may be piggybacked onto certain control messages having other functions beyond paging, e.g., control messages communicated during a RACH procedure or, generally, during the connection setup 2012.

In the various examples described herein, timing synchronization between the BS 101, the relay UE 102, and the remote UE 103 may be desirable. Such timing synchronization enables transmission of respective paging control messages during the active times 201 of the DRX cycles 200 of the relay UE 102 and/or the remote UE 103.

Figure 11:
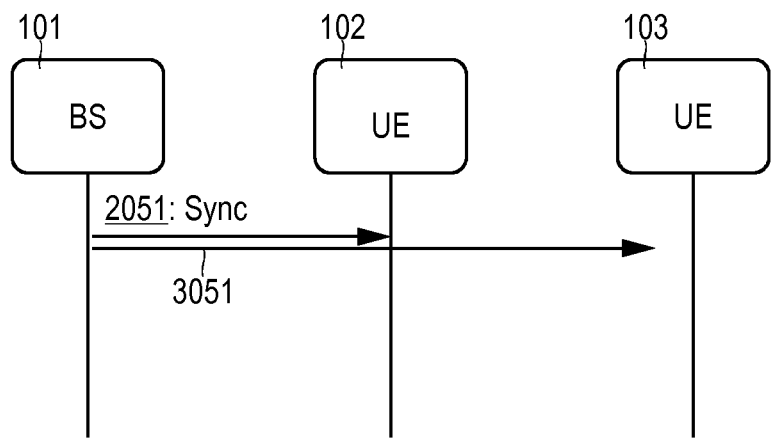
FIG. 11 is a signaling diagram schematically illustrating time synchronization between the network, the relay UE, and the remote UE according to various examples.

FIG. 11 illustrates aspects with respect to timing synchronization between the BS 101, the relay UE 102, and the remote UE 103. In the example of FIG. 11, synchronization signals 2051 are transmitted at 3051 to, both, the relay UE 102, as well as the remote UE 103. For example, the synchronization signals 2051 could be broadcasted as part of information block such as the 3GPP LTE Master Information Block (MIB) and/or the 3GPP LTE Secondary Information Block (SIB).

The scenario of FIG. 11 corresponds to the remote UE 103 being positioned within coverage of the BS 101. However, other scenarios are conceivable, in which the remote UE 103 is not positioned within coverage of the BS 101. In such a scenario, D2D synchronization signals (D2DSS) can be communicated between one or more relay UEs and the remote UE 103. Such a scenario is illustrated in FIG. 12.

Figure 12:
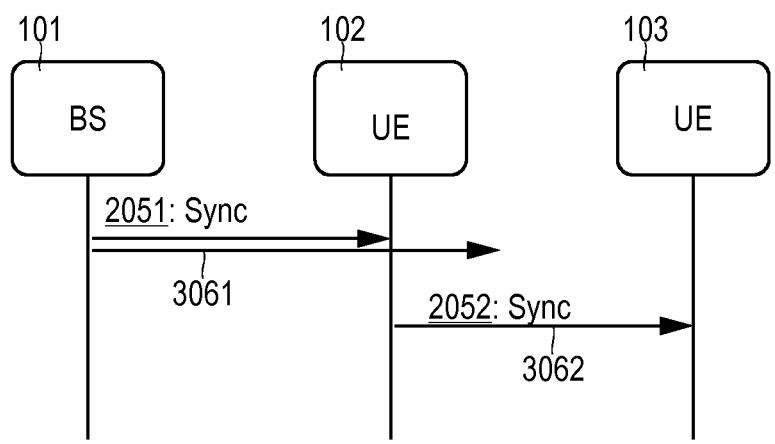
FIG. 12 is a signaling diagram schematically illustrating time synchronization between the network, the relay UE, and the remote UE according to various examples.

FIG. 12 illustrates aspects with respect to time synchronization between the BS 101, the relay UE 102, and the remote UE 103. Also in the example of FIG. 12, the BS 101 transmits the synchronization signals 2051 at 3061. However, in the example of FIG. 12, the remote UE 103 is not within coverage of the BS 101 and, therefore, fails to receive the synchronization signals 2051. In this scenario, the relay UE 102 provides D2DSSs 2052 at 3062.

Generally, any relay UE 102 may be configured to provide the D2DSSs 2052, i.e., the relay UE 102 or another relay UE which does not provide the paging functionality as explained above. For example, if transmission of the D2DSSs 2052 is generally implemented with respect to synchronization groups, it may be possible to re-use the D2DSSs across different groups in order to achieve synchronization between the remote UE 103 and the BS 101.

By the techniques disclosed above, timing synchronization between the BS 101, the relay UE 102, and the remote UE 103 is facilitated. Nonetheless, it is possible that timing drifts occur. In order to address for these timing drifts, it is possible that the relay UE 102 sends a burst of paging control messages 2012 to the remote UE 103, wherein the burst may be centered with respect to the center of the respective active time 201 of the DRX cycle 200 of the remote UE 103 anticipated based on the timing information. Such a scenario is illustrated in FIG. 13.

Figure 13:
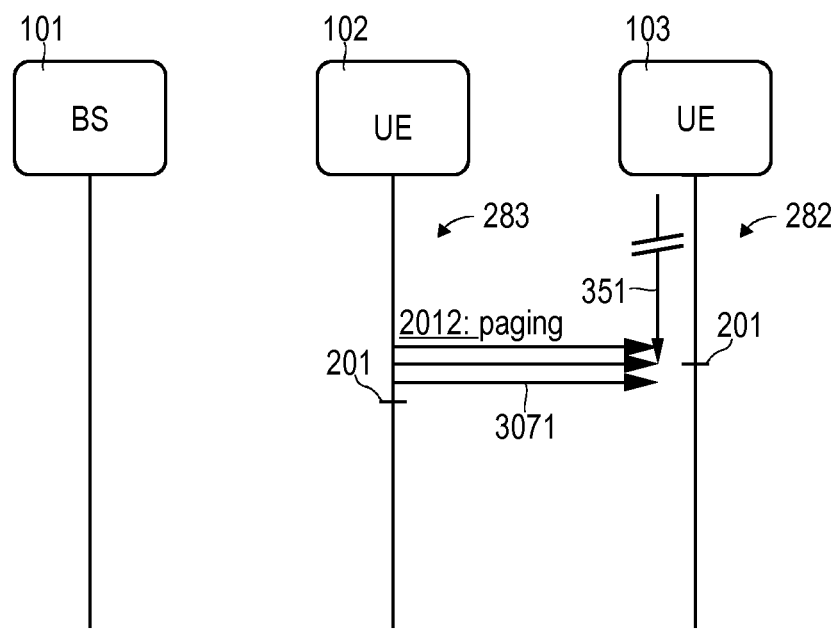
FIG. 13 is a signaling diagram schematically illustrating network paging of a remote UE via a relay UE according to various examples.

FIG. 13 illustrates aspect with respect to the network paging. FIG. 13 is a detail of the implementation of FIGS. 8 and 9. In particular, FIG. 13 illustrates the transmission of the paging control message 2012 at 3071 in accordance with the time offset 351 indicated by the timing information. As illustrated in FIG. 13, the paging control message 2012 is transmitted by the relay UE 102 a plurality of times in immediate succession. For example, a corresponding burst could include multiple transmissions within a single subframe of the transmission protocol implemented on the D2D channel 195, 196. The multiple transmissions of the paging control message 2012 are centered with respect to the expected active time 201. Therefore, timing drifts—due to imperfect synchronization between the BS 101, the relay UE 102, and the remote UE 103—can be accounted for.

Figure 14:
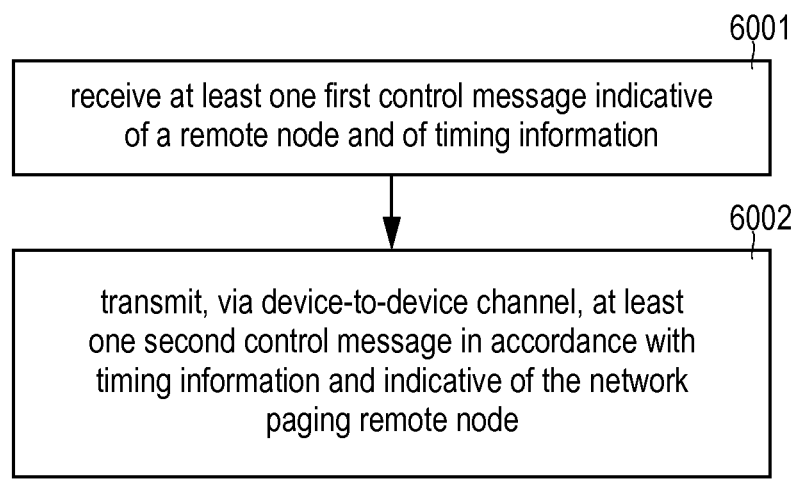
FIG. 14 is a flowchart of a method according to various examples.

FIG. 14 is a flowchart of a method according to various examples. For example, the method according to the example of FIG. 14 could be implemented by the relay UE 102. For example, the method according to the example of FIG. 14 could be implemented by the processor 1021 and the memory 1025 of the relay UE 102. Generally, the method according to the example of FIG. 14 may be executed by a relay node.

First, in block 6001, at least one first control message is received. The at least one first control message is indicative of remote node and of timing information. For example, the at least one control message may be explicitly or implicitly indicative of the remote node and the timing information. For example, the at least one control message may include respective indicators indicative of the remote node—e.g., of an identity of the remote node and/or a resources used by the remote node—and the timing information.

For example, the at least one first control message may be a Layer 2 or Layer 3 control message or a control message residing on an even higher layer according to the OSI model. The first control message may be a Layer 1 page message potentially extended with mentioned control information explicit or implicit indicated.

For example, the at least one first control message may be received on a direct channel from a BS of the network. For example, the at least one first control message may be received during an active time of a sleep pattern implemented by the node executing the method according to FIG. 14. In other examples, it would also be possible that the node implementing the method according to FIG. 14 is operated in a connected mode and does not implement a sleep pattern.

Next, at 6002, at least one second control message is transmitted in accordance with the timing information. The at least one second control message is transmitted to the remote node. This may be facilitated by the at least one first control message being indicative of the remote node.

The at least one second control message is indicative of the network paging the remote node. As such, the at least one second control message may be a Layer 1 paging signal transmitted on resources on which the remote node is listening for network paging. For example, the resources may be allocated on the D2D channel of the wireless link. In some examples, the at least one second control message may include an announcement for establishing a D2D connection between the relay node and the remote node.

As such, it is possible that the remote node is preconfigured to listen for network paging on the D2D channel of the wireless link—instead of listening for network paging on a direct channel of a BS of the network.

In some examples, in response to transmitting the at least one second control message in 6002, it would be possible to setup a data connection with the remote node. The data connection can be set up via the D2D channel. Furthermore, the data connection with the remote node can be extended to the BS of the network, thereby implementing relay functionality. However, in other examples, it would also be possible that in response to transmitting the at least one second control message the remote node establishes the data connection via a different relay node or with the network directly.

FIG. 15 is a flowchart of a method according to various examples. For example, the method according to FIG. 15 may be executed by a BS or a control node of a core of the network. For example, it would be possible that the method according to the example of FIG. 15 is executed by the processor 1011 of the BS 101 and/or the processor 1091 of the control node 109—e.g., implemented by the MME 116.

In 6011, transmission of at least one first control message is triggered. The at least one control message is indicative of a remote node and of timing information. For example, said triggering of transmission of the at least one first control message may include: transmitting a core-network control message—e.g., according to the DIAMETER protocol or on the 3GPP LTE S1-MME reference point—between a CN control node and the BS of the network and/or transmitting the at least one first control message on a wireless link of the network.

The at least one first control message is transmitted to a relay node. The at least one first control message may cause the relay node to transmit at least one second control message to a remote node. This may facilitate paging of the remote node.

Figure 16:
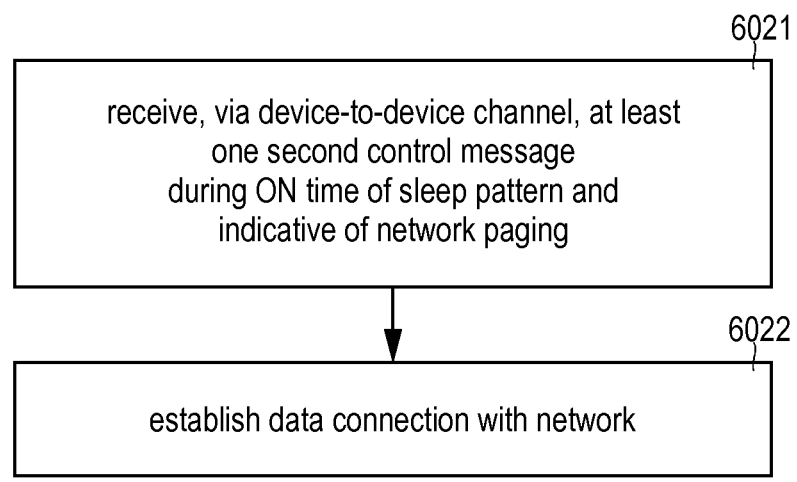
FIG. 16 is a flowchart of a method according to various examples.

FIG. 16 is a flowchart of a method according to various examples. For example, the method according to the example of FIG. 16 may be executed by a remote node. For example, the method according to the example of FIG. 16 may be executed by the processor 1021 of the remote UE 103.

First, at 6021, at least one second control message is received via a D2D channel during an active time of a sleep pattern, e.g., a DRX cycle. The at least one second control message is indicative of network paging. For example, remote node can be preconfigured to listen for paging on resources allocated on the D2D channel—instead of listening for paging on resources allocated on a direct channel of a BS of the network.

In response to receiving the at least one second control message, at 6022, a data connection with the network is established. For example, prior to executing 6022, a decision could be made with respect to the parameters of establishing the data connection. For example, the data connection could be established on a direct channel of the wireless link, i.e., without intermediate relay nodes. In a further example, the data connection could be established via the relay node from which the at least one second control message is received at 6021. In yet another example, the data connection could be established via a further relay node.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while above various examples have been described with a sleep pattern being implemented by DRX, in other examples other kinds and types of sleep patterns could be employed.

For further illustration, while various examples have been described with respect to cellular networks, in other examples other kinds and types of networks may be employed such as point-to-point networks.

For example, while above various examples have been described with the relay functionality being implemented by a relay UE, in other examples the relay functionality could be implemented by a stationary relay node.

The invention claimed is:

1. A method, comprising:
    a relay node receiving, from a network node of a network and via a wireless link, at least one first control message indicative of a remote node and of timing information, wherein the timing information is specific to the remote node, and
    the relay node transmitting, to the remote node, at least one second control message in accordance with the timing information, each one of the at least one second control message being indicative of the network paging the remote node,
    wherein the at least one first control message is received during an active time of a sleep pattern of the relay node, and
    wherein the method further includes, in response to said receiving of the at least one first control message, the relay node modifying the sleep pattern of the relay node to transmit the at least one second control message in accordance with the timing information.

2. The method of claim 1, further comprising:
    the relay node establishing a data connection with the network.

3. The method of claim 2,
    wherein the data connection is established in response to said receiving of the at least one first control message.

4. The method of claim 2,
wherein said establishing of the data connection is triggered by a connection setup of the remote node via the relay node.

5. The method of claim 1,
wherein each one the at least one second control message is indicative of an announcement for device-to-device discovery of the relay node by the remote node or is communicated on a pre-configured device-to-device channel.

6. The method of claim 1,
wherein the timing information is indicative of at least one of the following:
- a time offset between transmission of the at least one first control message and transmission of the at least one second control message;
- a delay until transmission of the at least one second control message;
- a point in time of transmission of the at least one second control message; and
- multiple repetition transmission occasions of the at least one second control message.

7. A method, comprising:
triggering transmission, via a wireless link and to a relay node, of at least one first control message indicative of a remote node and of timing information, wherein the timing information is specific to the remote node,
wherein the at least one first control message causes the relay node to transmit, to the remote node, at least one second control message in accordance with the timing information, each one of the at least one second control message being indicative of the network paging the remote node,
wherein the at least one first control message is transmitted during an active time of a sleep pattern of the relay node, and
wherein the at least one first control method further causes the relay node to modify the sleep pattern of the relay node to transmit the at least one second control message in accordance with the timing information.

8. The method of claim 7, further comprising:
determining the timing information based on the sleep pattern of the relay node and further based on a sleep pattern of the remote node,
wherein the sleep pattern of the relay node is different from the sleep pattern of the remote node.

9. The method of claim 7, further comprising:
negotiating, with the relay node, the sleep pattern of the relay node, and
negotiating, with the remote node, a sleep pattern of the remote node,
wherein said negotiating of the sleep pattern of the relay node is independent of said negotiating of the sleep pattern of the remote node.

10. The method of claim 7, further comprising:
setting, in accordance with the timing information, at least one of a paging escalation timer for paging the remote node in further cells of the network and a de-registration timer for listing the remote node as disconnected.

11. A method, comprising:
a remote node receiving, from a relay node, at least one second control message during an active time of a sleep pattern of the remote node, timing information for the at least one second message, and specific to the remote node, being received by the relay node in at least one first control message from a network node received during an active time of a sleep pattern of the relay node, the sleep pattern being modified by the relay node to transmit the at least one second control message, wherein each one of the at least one second control message is indicative of the network paging the remote node, and
establishing a data connection with the network in response to receiving the at least one second control message.

12. The method of claim 11, further comprising:
selecting between establishing the data connection with the network via a device-to-device channel of the relay node, a further device-to-device channel of a further relay node, or on a direct channel of a network node in response to receiving the at least one second control message.

* * * * *